Patented Feb. 11, 1930

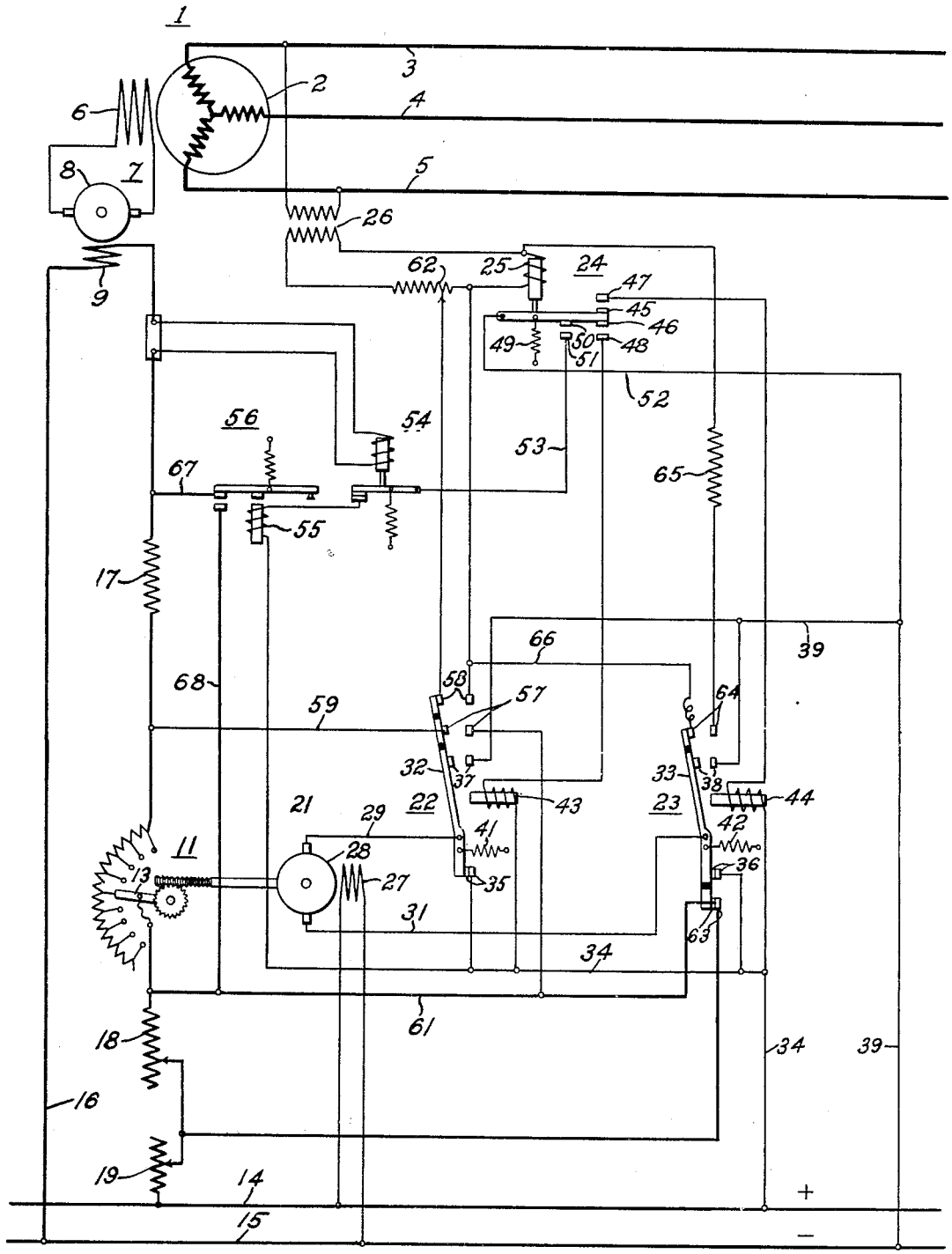

1,746,630

UNITED STATES PATENT OFFICE

ROYAL C. BERGVALL AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA

REGULATOR SYSTEM

Application filed June 29, 1928. Serial No. 289,189.

Our invention relates to regulator systems and more particularly to regulator systems for governing electric quantities of dynamo-electric machines.

An object of our invention is to provide a regulating system that shall be quick acting and accurate in its operation.

A further object of our invention is to provide a regulator system of the rheostatic type with means for forcing the field of the regulated machine during the operation of the regulating rheostat for the purpose of producing a high-speed excitation system.

A further object of our invention is to provide a regulating system of the above indicated character wherein the rate for forcing the field of the regulator machine is increased when the regulated quantity falls below a predetermined value.

Our invention contemplates the use of a motor-operated rheostat in the field circuit of a dynamo-electric machine, and the provision of means for causing a rapid change in the field excitation of the machine during the corrective action of the regulator and rheostat. The voltage impressed on the field winding of the machine may be abruptly varied by the operation of a switch, or relay contact members, to shunt a resistor from, or to introduce a resistor into, the field-winding circuit of the regulated machine, or of the exciter connected to the field winding of the regulated machine, during the operation of the rheostat.

By this means, the change in voltage that is impressed upon the field winding of the machine, for a required correction in the excitation thereof, may be several times the amount required to ultimately produce the desired correction in the excitation of the machine, and, consequently, the time required for the desired change in the value of the field flux is considerably reduced. This arrangement, therefore, gives a high-speed-excitation system, while, at the same time, retains the desirable characteristics of the rheostat-type regulator.

The regulator system may be so arranged that the abrupt change in the voltage impressed upon the field winding of the machine may be performed in two or more steps, depending upon the degree of variation of the regulated quantity from its desired value, so that a relatively small abrupt change is made in the regulating system when the variation in the regulated quantity is small, and a relatively large abrupt change is made by the regulating system when the variation of the regulated quantity from its desired value is correspondingly large.

The rapid change in field excitation of the controlled dynamo-electric machine, during the operation of the regulator, also provides a very effective antihunting means, since the normal or static condition of the machine field winding is promptly restored upon the operation of the regulator to cause the regulator contact members to become disengaged, which will be prior to an overtravel of the regulating rheostat.

In the accompanying drawing, the single figure is a diagrammatic view of apparatus and circuits comprising an embodiment of our invention.

Referring to the drawing, an electric generator 1 is provided having an armature winding 2 that is connected to supply conductors 3, 4, 5, and a field winding 6 that is connected to be energized from an exciter generator 7. The exciter generator 7 is provided with an armature winding 8 and a field winding 9. A motor-operated rheostat 11 is provided having a resistor element 12 and a movable arm 13, and is connected in series-circuit relation with the field winding 9 of the exciter generator, which is energized from the supply conductors 14 and 15. The circuit extends from the supply conductor 15 through conductor 16, field winding 9, resistor 17, rheostat 11, resistor 18 and resistor 19. The rheostat 11 is the primary means for regulating the field winding 9 of the exciter generator, the resistors 17 and 18, being short circuited under certain operating conditions of the regulating system to be later explained. The rheostat or resistor 19 represents a block of resistance which may or may not be required to be permanently connected in the field-winding circuit of the exciter.

The regulating rheostat 11 is operated by a pilot motor 21 that is controlled by the reversible switches 22 and 23 in accordance with the operation of a contact-making voltmeter or regulator 24. The regulator 24 comprises an actuating coil 25 that is operatively connected, by means of a voltage transformer 26, to be energized in accordance with the voltage of the generator 1.

The pilot motor 21 is provided with a field winding 27 that is connected to the supply conductors 14 and 15, or to any other suitable source of direct current, and with an armature winding 28 that is connected, by means of conductors 29 and 31, to the movable contact arms 32 and 33, respectively, of the reversing switches 22 and 23.

When the reversing switches 22 and 23 are deenergized, and stand in the positions illustrated, a circuit from the armature winding of the pilot motor 21 is completed through the cooperating pairs of contact members 35 and 36 of the reversing switches 22 and 23, respectively, and through the conductor 34, thus forming a closed or dynamic-braking circuit for the pilot motor. The contact members 35 and 36 of the reversing switches are connected, by means of a conductor 34, to one of the direct-current supply conductors 14.

The stationary members of similar pairs of contact members 37 and 38 are connected, by means of the conductor 39, to the supply conductor 15 and are adapted to connect one side of the pilot-motor-armature winding to the supply conductor 15 upon the operation of the one of the reversing switches, 22 and 23, to its second operative position.

The reversing switches 22 and 23 are provided with biasing members 41 and 42, respectively, for normally biasing the switches to their illustrated or dynamic-braking positions. The reversing switches are also provided with electromagnets that are energized in accordance with the operation of the regulator 24.

The regulator 24 comprises movable contact members 45 and 46 that are adapted to engage stationary contact members 47 and 48 and are connected, by means of conductors 52 and 39, to one of the supply conductors 15. The regulator 24 is also provided with a movable contact member 50 that is adapted to engage a stationary contact member 51 should the energization of the regulator winding 25 decrease a predetermined amount below that value required to cause engagement of the contact members 46 and 48. The contact-carrying arm of the regulator is normally biased downwardly, against the pull of the winding 25, by means of a spring member 49.

Upon engagement of the contact members 45 and 47, a circuit is completed from the supply conductor 15, through conductors 39 and 52, contact members 45 and 47, the operating coil 44 of the reversing switch 23 and conductor 34, to the supply conductor 14. Upon engagement of the contact members 46 and 48, a circuit is completed from the supply conductor 15, through the conductors 39 and 52, contact members 46 and 48, the operating winding 43 of reversing switch 22 and conductor 34, to the supply conductor 14. Upon engagement of the contact members 50 and 51, a circuit is completed from the supply conductor 15, through conductors 39 and 52, contact members 50 and 51, conductor 53, normally closed contact members of the relay 54, the operating winding 55 of the relay 56 and, by means of conductor 34, to supply conductor 14.

The operation of the regulator system is as follows: If the voltage of the generator 1 falls below the desired value the energization of the regulator winding 25 is decreased, thus permitting the spring 49 to actuate the contact-carrying lever of the regulator downwardly to cause engagement of the contact members 46 and 48 and thus effect energization of the winding 43 of the reversing switch 22 through the circuit traced above. The reversing switch 22 is thus actuated to a second operating position to separate the pair of contact members 35 and cause engagement of the cooperating pairs of the contact members 37, 57 and 58. A circuit through the armature winding 28 of the pilot motor 21 may now be traced from conductor 14, through conductor 34, the contact members 36 of the reversing switch 23, conductor 31, armature winding 28, conductor 29, contact members 37 of the reversing switch 22 and conductor 39, to the supply conductor 15, thus causing the pilot motor to operate the rheostat in a direction to decrease the resistance in circuit with the field winding 9 and to increase the excitation of the pilot generator 7 and the generator 1.

Actuation of the reversing switch 22 to its second operating position also completes a circuit in shunt relation to the rheostat 11, through the conductor 59, contact members 57 of the reversing switch 22 and conductor 61, thus entirely excluding the rheostat 11 from the field circuit of the exciter generator 7 during the operation of the rheostat and causing the voltage of the exciter generator to rise rapidly.

The contact members 58 of the reversing switch 22 cause a portion of the resistor 62 to be excluded from the circuit of the regulator winding 25, thus increasing the energization thereof slightly and hastening the separation of the contact members 46 and 48, and therefore, preventing the regulator from hunting.

When the voltage of the machine 1 again approaches its normal value, the contact members 46 and 48 will be disengaged, and the reversing switch 22 will be immediately biased to its illustrated position, thus closing the above traced dynamic-braking circuit through the contact members 35 to cause the pilot motor 21 to stop promptly and, by separating the contact members 57, interrupt the circuit in shunt relation to the rheostat 11 and thus introduce it into the field winding circuit of the exciter generator. If the operation of the regulating rheostat 11 has been sufficient to correct the voltage of the generator 1, and bring it back to its desired value, the system will remain at rest until another variation in the line voltage occurs. If, however, the forcing of the field of the exciter generator 7, caused by shunting the rheostat 11 from the field-winding circuit through the contact members 57, has caused the voltage of the generator to rise so rapidly that the full correction required in the setting of the rheostat 11 has not been made prior to the separation of the regulating contact members 46 and 48, the voltage of the line conductors will again drop, thus causing the regulator 24 to again close the circuit through the contact members 46 and 48 and continue the operation of the rheostat 11. This action will be repeated until the requided correction has been made.

If the voltage of the generator 1 rises above its desired value, the winding 25 of the contact-making voltmeter 24 will be energized sufficiently to cause engagement of the contact members 45 and 47, thus completing a circuit through the operating winding 44 of the reversing switch 43, as traced above, and causing the switch 23 to be acutated to its second operating position. Upon the operation of the reversing switch 23 to its second operating position, the pairs of cooperating contact members 36 and 63 are disengaged, and the pairs of cooperating contact members 38 and 64 are brought into engagement.

A circuit is completed through the armature winding 28 of the pilot motor 21 in the opposite direction from that completed upon the operation of the reversing switch 22 above described. This circuit may be traced from the direct-current supply conductor 14, through conductor 34, the contact members 35 of the reversing switch 22, conductor 29, armature winding 28, conductor 31, contact members 38 of the reversing switch 23 and conductor 39, to the supply conductor 15. The pilot motor 21, is therefore, caused to operate in the reverse direction and to actuate the rheostat 11 in a direction to increase the resistance in the field-winding circuit of the exciter generator 7, to thereby decrease the voltage of the exciter generator and the voltage of the generator 1.

The above described operation of the reversing switch 23 to its second operative position interrupts the circuit through the contact members 63 that is normally in shunt relation to the resistor 18, thus introducing the resistor 18 into the field-winding circuit of the generator and causing the excitation thereof to decrease rapidly during the operation of the rheostat 11. In the second operating position of the switch 23, the contact members 64 are in engagement to complete a circuit through the resistor 65 and conductor 66 in shunt relation to the winding 25 of the regulator, thus decreasing the energization of the regulator winding and hastening the disengagement of the contact members 45 and 47 to prevent the regulator 24 from hunting. When the voltage of the generator has decreased to substantially the desired value, the contact members 45 and 47 will be disengaged, and the reversing switch 23 will return to its illustrated position to complete the dynamic-braking circuit for the pilot motor 21 through the contact members 36 thus promptly stopping the pilot motor.

If the operation of the regulating rheostat 11 has not been sufficient to correct the excitation of the generator and to maintain its desired voltage, the regulator 24 will again operate and continue the correction, as above described.

If the voltage of the power line 3, 4, 5 drops considerably, as may be the case upon occurrence of a short circuit or other fault upon the power line, the energization of the winding 25 of the regulator 24 will decrease, first causing engagement of the contact members 46 and 48 and the operation of the pilot motor 21 and the rheostat 11, as described above, and, as the voltage decreases below a predetermined value, the regulator will cause engagement of the contact members 50 and 51, thus completing the circuit through the contact members of the relay 54 and the winding 55 of the relay 56, as described above. The relay 56 is, therefore, actuated to close its contact members, thus completing a circuit through conductors 67 and 68 in shunt relation to the resistor 17 and the rheostat 11 and causing a very rapid rise in the excitation of the exciter 7. If the maximum allowable excitation current is applied to the field winding 9 before the regulator 24 has operated to separate the contact members 50 and 51 the current-responsive relay 54 will be actuated to separate its contact members, thus causing the operating winding 55 of the relay 56 to become deenergized, the relay 56 operating to again introduce the resistor 17 in circuit with the field winding of the exciter. The operation of the relay 56 above described, causes a very rapid increase in the excitation of the exciter field winding, thus rapidly increasing the voltage of the dynamo-electric machine 1 to its normal value.

Since many modifications may be made in the apparatus and circuits described without departing from the spirit of our invention, we do not wish to be limited otherwise than by the scope of the appended claims.

We claim as our invention:

1. In a regulator system, a dynamo-electric machine comprising a field winding, means for governing the excitation of said field winding comprising a variable resistor and a second resistor normally connected in circuit therewith, means operable to gradually actuate said variable resistor, means for short circuiting said variable resistor during predetermined regulating operations, and means for short circuiting both said variable resistor and said second resistor upon other predetermined regulating operations.

2. In a regulator system, a dynamo-electric machine comprising a field winding, a rheostat in circuit with said field winding, means actuated in accordance with an electrical quantity of said dynamo-electric machine for operating said rheostat, and a plurality of means effective only during the operation of the rheostat and in accordance with the variation of the regulated quantity from its desired value for abruptly varying the resistance in circuit with said field winding.

3. In a regulator system, a power circuit, a dynamo-electric machine for varying an electrical quantity of the power circuit and comprising a field winding, a circuit for energizing said field winding, a rheostat connected in said field-winding circuit, means actuated in accordance with an electrical quantity of said power circuit for operating said rheostat, and means for closing a circuit in shunt relation to said rheostat during its operation in one direction, a resistor in said field-winding circuit and means actuated in accordance with a predetermined value of the regulated quantity of said power circuit for short circuiting both the rheostat and the resistor.

4. In a regulator system, a power circuit, a dynamo-electric machine for varying an electrical quantity of the power circuit and comprising a field winding, means actuated in accordance with an electrical quantity of said power circuit for gradually varying the excitation of said field winding, a plurality of means for abruptly varying the excitation of said field winding, and a single control means for actuating said several means upon different predetermined values of the regulated quantity during the operation of said means for gradually varying the excitation of said field winding.

5. In a regulator system, a power circuit, a dynamo-electric machine for varying an electrical quantity of the power circuit and comprising a field winding, a circuit for energizing said field winding and including a plurality of resistor devices for varying the voltage impressed upon said field winding, and a single control means actuated in accordance with an electrical quantity of said power circuit for varying the setting of one of said resistor devices, and for controlling circuits in shunt relation to said several resistor devices.

6. In a regulator system, a power circuit, a dynamo-electric machine for varying an electrical quantity of the power circuit and comprising a field winding, a circuit for energizing said field winding and including a plurality of resistor devices for varying the voltage impressed upon said field winding, a regulator actuated in accordance with an electrical quantity of said power circuit, means controlled by said regulator for varying the setting of one of said resistor devices upon a variation of the regulated quantity from its desired value, means controlled by said regulator for shunting certain of said resistor devices from said field-winding circuit upon a predetermined value of the regulated quantity, and means actuated in accordance with a predetermined excitation of said field winding for interrupting the action of said last named means.

In testimony whereof, we have hereunto subscribed our names this 25th day of June, 1928

ROYAL C. BERGVALL.
JOHN H. ASHBAUGH.